(12) United States Patent
Lee et al.

(10) Patent No.: US 11,178,455 B1
(45) Date of Patent: Nov. 16, 2021

(54) DISPLAY DEVICE AND METHOD OF OPERATING THE SAME

(71) Applicant: LG ELECTRONICS INC., Seoul (KR)

(72) Inventors: Kyungryun Lee, Seoul (KR); Miyeon Kwon, Seoul (KR); Sangjin Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/013,447

(22) Filed: Sep. 4, 2020

(30) Foreign Application Priority Data

Jun. 10, 2020 (WO) ................ PCT/KR2020/007532

(51) Int. Cl.
*H04N 21/485* (2011.01)
*H04N 21/442* (2011.01)
*H04N 21/6371* (2011.01)
*H04N 21/4363* (2011.01)

(52) U.S. Cl.
CPC . *H04N 21/44227* (2013.01); *H04N 21/43635* (2013.01); *H04N 21/485* (2013.01); *H04N 21/6371* (2013.01)

(58) Field of Classification Search
None
See application file for complete search history.

(56) References Cited

U.S. PATENT DOCUMENTS

| | | | |
|---|---|---|---|
| 8,881,208 B2 | 11/2014 | Park et al. | |
| 10,002,524 B2 | 6/2018 | Shim et al. | |
| 2009/0284656 A1* | 11/2009 | Suzuki | H04N 5/44513 348/554 |
| 2010/0008636 A1* | 1/2010 | Ohno | H04N 5/4401 386/215 |
| 2010/0225814 A1* | 9/2010 | Kozono | H04N 5/44543 348/554 |
| 2012/0185580 A1* | 7/2012 | Detert | H04L 29/06027 709/223 |

(Continued)

FOREIGN PATENT DOCUMENTS

| | | |
|---|---|---|
| EP | 2843959 | 3/2015 |
| KR | 1020090074860 | 7/2009 |

(Continued)

OTHER PUBLICATIONS

European Patent Office Application Serial No. 20190739.1, Search Report dated Nov. 17, 2020, 9 pages.

(Continued)

*Primary Examiner* — William J Kim
(74) *Attorney, Agent, or Firm* — Lee, Hong, Degerman, Kang & Waimey

(57) ABSTRACT

A display device includes a display, a network interface for connection with a access point, an external device interface configured to receive image data from an external device, and a processor configured to acquire information on the external device connected to the external device interface, receive an information set of a plurality of search devices connected through an Internet network from the access point, and display a test screen for checking connection of the external device on the display when any one of the plurality of search devices matches the external device based on the information on the external device and the information set.

15 Claims, 13 Drawing Sheets

(56) References Cited

U.S. PATENT DOCUMENTS

| | | | |
|---|---|---|---|
| 2013/0188097 A1* | 7/2013 | Smith | H04N 5/00 348/720 |
| 2013/0229579 A1* | 9/2013 | Jiang | H04N 21/43615 348/569 |
| 2014/0313419 A1* | 10/2014 | Kim | H04N 21/4131 348/734 |
| 2014/0313420 A1* | 10/2014 | Kim | H04N 21/44227 348/734 |
| 2014/0362294 A1* | 12/2014 | Majid | H04N 21/485 348/564 |
| 2015/0012646 A1 | 1/2015 | Yang et al. | |
| 2015/0067729 A1 | 3/2015 | Yoon et al. | |
| 2015/0134860 A1* | 5/2015 | Lee | G06F 13/4221 710/9 |
| 2015/0154858 A1 | 6/2015 | Arling et al. | |
| 2015/0373390 A1 | 12/2015 | Park | |
| 2016/0142647 A1* | 5/2016 | Gopinath | H04N 21/44227 348/706 |
| 2019/0371163 A1 | 12/2019 | Arling | |
| 2019/0379887 A1 | 12/2019 | Marino et al. | |
| 2021/0084253 A1* | 3/2021 | Doi | H04N 21/43635 |

FOREIGN PATENT DOCUMENTS

| | | |
|---|---|---|
| KR | 101799311 | 11/2017 |
| KR | 102062580 | 2/2020 |
| WO | 2013109117 | 7/2013 |

OTHER PUBLICATIONS

PCT International Application No. PCT/KR2020/007532, International Search Report dated Feb. 26, 2020, 3 pages.

\* cited by examiner

700

{"spdVendorName":"M", "spdProductDescription":"H", "spdSourceDeviceInfo":"Digital STB"}

└──▶ NaNa stick

800

{"deviceName":"NaNa", "deviceId":"aaaa"}
{"deviceName":"NaNa", "deviceId":"bbbb"}
{"deviceName":"NaNa", "deviceId":"cccc"}

NaNa stick

DISPLAY DEVICE AND METHOD OF OPERATING THE SAME

CROSS-REFERENCE TO RELATED APPLICATION

Pursuant to 35 U.S.C. § 119 (a), this application claims the benefit of an earlier filing date and right of priority to International Application No. PCT/KR2020/007532 filed on Jun. 10, 2020, the contents of which are hereby incorporated by reference herein in its entirety.

BACKGROUND

The present disclosure relates to a display device and a method of operating the same.

Digital TV services using wired or wireless communication networks are becoming common. Digital TV services may provide a variety of services that could not be provided in the conventional analog broadcasting service.

For example, IPTV (Internet Protocol Television), which is a type of digital TV service, and smart TV services provide bidirectionality that allows a user to actively select a type of a viewing program and a viewing time. IPTV or smart TV services may provide a variety of additional services, such as Internet search, home shopping, and online games based on this bidirectionality.

Recently, a universal serial bus (USB) type IP device may be connected to a TV to perform the function of a set-top box.

However, an unintended connection attempt may be made with respect to an IP device which is not actually connected to a TV. For example, an internet protocol (IP) device of a neighboring house using the same access point may be searched and connected.

In addition, since an IP device searched through IP may not know an external input terminal connected to a TV, a user needs to check to which external input terminal the IP device is connected.

In addition, when a plurality of IP devices of the same type is connected to a network, it is impossible to determine which IP device is connected to a TV.

In a connection process, another IP device may be connected or device connection settings may be incorrect due to incorrect input of the user.

SUMMARY

An object of the present disclosure is to provide a display device capable of grasping an IP device connected to a display device among a plurality of devices connected through a access point.

Another object of the present disclosure is to determine which external input terminal of a display device is connected with an IP device searched through IP.

Another object of the present disclosure is to control an IP device which may not be controlled by a remote controller of an existing display device.

A display device according to an embodiment of the present invention includes a display, a network interface for connection with a access point, an external device interface configured to receive image data from an external device, and a processor configured to acquire information on the external device connected to the external device interface, receive an information set of a plurality of search devices connected through an Internet network from the access point, and display a test screen for checking connection of the external device on the display when any one of the plurality of search devices matches the external device based on the information on the external device and the information set.

A method of operating a display device according to an embodiment of the present disclosure includes acquiring information on an external device connected to an external device interface, receiving an information set of a plurality of search devices connected through an Internet network from a access point, determining whether any one of the plurality of search devices matches the external device based on the information on the external device and the information set, and displaying a test screen for checking connection of the external device when any one of the plurality of search devices matches the external device.

DETAILED DESCRIPTION OF THE EMBODIMENTS

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present disclosure, for example, as an artificial display device that adds a computer supporting function to a broadcast receiving function, may have an easy-to-use interface such as a writing input device, a touchscreen, or a pointing device, as an Internet function is added while fulfilling a broadcast receiving function. Then, with the support of a wired or wireless Internet function, it is possible to perform an e-mail, web browsing, banking, or game function in access to the Internet and computers. In order to perform such various functions, standardized general purpose OS may be used.

Accordingly, since various applications are freely added or deleted on a general purpose OS kernel, a display device described herein, for example, may perform various user-friendly functions. The display device, in more detail, may be a network TV, Hybrid Broadcast Broadband TV (HBBTV), smart TV, light-emitting diode (LED) TV, organic light-emitting diode (OLED) TV, and so on and in some cases, may be applied to a smartphone.

Figure 1:
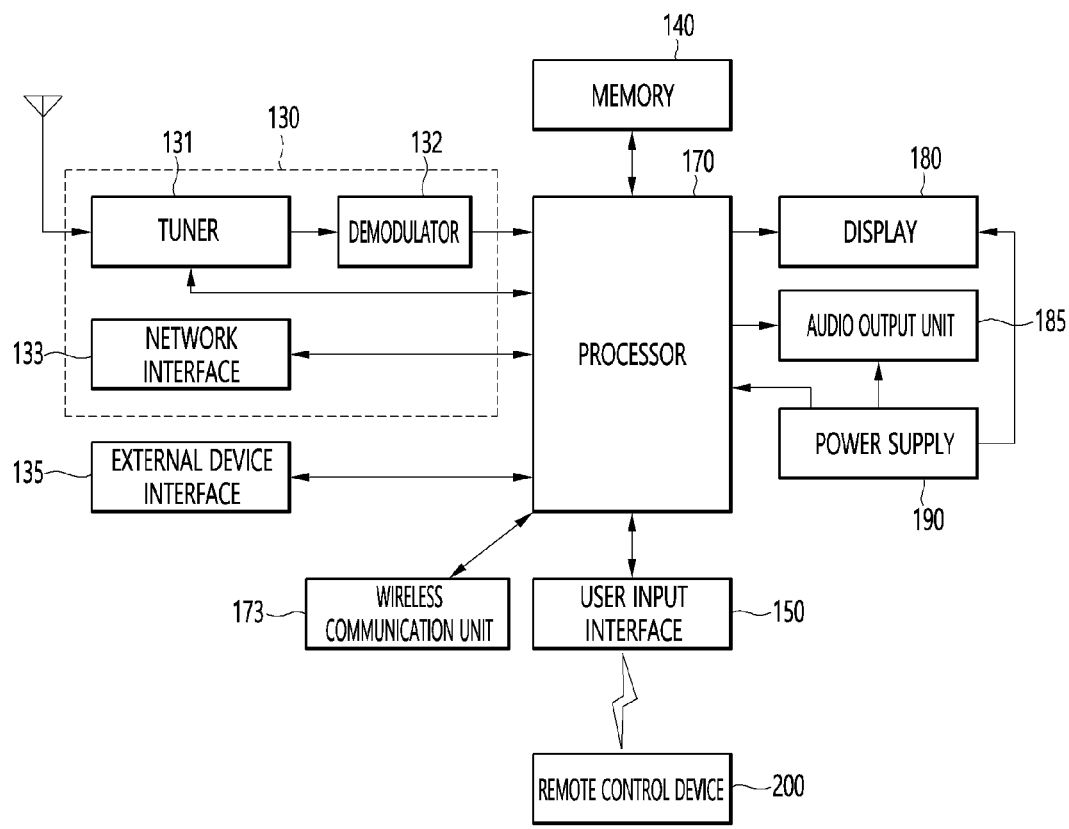
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 may include a broadcast reception unit 130, an external device interface 135, a memory 140, a user interface 150, a processor 170, a wireless communication unit 173, a display 180, an audio output unit 185, and a power supply 190.

The broadcast reception unit 130 may include a tuner 131, a demodulator 132, and a network interface 133.

The tuner 131 may select a specific broadcast channel according to a channel selection command. The tuner 131 may receive broadcast signals for the selected specific broadcast channel.

The demodulator 132 may divide the received broadcast signals into video signals, audio signals, and broadcast program related data signals and restore the divided video signals, audio signals, and data signals to an outputtable form.

The external device interface 135 may receive an application or an application list in an adjacent external device and transmit the application or the application list to the processor 170 or the memory 140.

The external device interface 135 may provide a connection path between the display device 100 and an external device. The external device interface 135 may receive at least one of a video or audio output from an external device that is connected to the display device 100 wirelessly or by wire and transmit the video or audio to the processor 170. The external device interface 135 may include a plurality of external input terminals. The plurality of external input terminals may include an RGB terminal, at least one High Definition Multimedia Interface (HDMI) terminal, and a component terminal.

An image signal of an external device input through the external device interface 135 may be output through the display 180. A voice signal of an external device input through the external device interface 135 may be output through the audio output unit 185.

An external device connectable to the external device interface 135 may be one of a set-top box, a Blu-ray player, a DVD player, a game console, a sound bar, a smartphone, a PC, a USB Memory, and a home theater system, but this is merely exemplary.

The network interface 133 may provide an interface for connecting the display device 100 to a wired/wireless network including the Internet network. The network interface 133 may transmit or receive data to or from another user or another electronic device through an accessed network or another network linked to the accessed network.

Additionally, some content data stored in the display device 100 may be transmitted to a user or an electronic device, which is selected from other users or other electronic devices pre-registered in the display device 100.

The network interface 133 may access a predetermined webpage through an accessed network or another network linked to the accessed network. In other words, the network interface 133 may transmit or receive data to or from a corresponding server by accessing a predetermined webpage through the network.

Then, the network interface 133 may receive content or data provided from a content provider or a network operator. In other words, the network interface 133 may receive contents such as movies, advertisements, games, VODs, and broadcast signals, which are provided from a content provider or a network provider, through network and information relating thereto.

Additionally, the network interface 133 may receive firmware update information and update files provided from a network operator and transmit data to an Internet or content provider or a network operator.

The network interface 133 may select and receive a desired application among applications open to the public, through network.

The memory 140 may store programs for signal processing and control in the processor 170 and signal-processed image, voice, or data signals.

Additionally, the memory 140 may perform a function for temporarily storing image, voice, or data signals received from the external device interface 135 or the network interface 133 and may store information on a predetermined image through a channel memory function.

The memory 140 may store an application or an application list received from the external device interface 135 or the network interface 133.

The display device 100 may play content files (for example, video files, still image files, music files, document files, application files, and so on) stored in the memory 140 and provide them to a user.

The user interface 150 may transmit signals input by a user to the processor 170 or transmit signals from the processor 170 to a user. For example, the user interface 150 may receive and process control signals such as power on/off, channel selection, and screen setting from the remote control device 200 or transmit control signals from the processor 170 to the remote control device 200, according to various communication methods such as Bluetooth, Ultra Wideband (WB), ZigBee, Radio Frequency (RF), and IR.

Additionally, the user interface 150 may transmit, to the processor 170, control signals received from local keys (not illustrated) such as a power key, a channel key, a volume key, and a setting key.

Image signals that are image-processed in the processor 170 may be input to the display 180 and displayed as an image corresponding to corresponding image signals. Additionally, image signals that are image-processed in the processor 170 may be input to an external output device through the external device interface 135.

Voice signals processed in the processor 170 may be audibly output to the audio output unit 185. Additionally, voice signals processed in the processor 170 may be input to an external output device through the external device interface 135.

Besides that, the processor 170 may control overall operations in the display device 100.

Additionally, the processor 170 may control the display device 100 by a user command or internal program input through the user interface 150, and download a desired application or application list into the display device 100 by accessing the network.

The processor 170 may output channel information selected by a user together with processed image or voice signals through the display 180 or the audio output unit 185.

Additionally, according to an external device image playback command received through the user interface 150, the processor 170 may output image signals or voice signals of an external device such as a camera or a camcorder, which are input through the external device interface 135, through the display 180 or the audio output unit 185. Moreover, the processor 170 may perform the display 180 to display images, and perform control such that the display 180 displays broadcast images input through the tuner 131, external input images input through the external device interface 135, images input through the network interface, or images stored in the memory 140, for example. In this case, an image displayed on the display 180 may be a still image or video and also may be a 2D image or a 3D image.

Additionally, the processor 170 may play content stored in the display device 100, received broadcast content, and external input content received from the outside, and the content may be in various formats such as broadcast images, external input images, audio files, still images, accessed web screens, and document files.

The wireless communication unit 173 may perform wired or wireless communication with an external device. The wireless communication unit 173 may perform short-range communication with an external device. For this, the wireless communication unit 173 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 may support wireless communication between the display device 100 and a wireless communication system, between the display device 100 and another display device 100, or between the display device 100 and a network, in which the display device 100 (or an external server) is located, through wireless area networks. The wireless area networks may be wireless personal area networks.

Herein, the other display device 100 may be a mobile terminal such as a wearable device (for example, a smart watch, smart glasses, and a head mounted display (HMD)) or a mobile terminal such as a smartphone, which is capable of exchanging data (or inter-working) with the display device 100. The wireless communication unit 173 may detect (or recognize) a communicable wearable device around the display device 100. Furthermore, if the detected wearable device is a device authenticated to communicate with the display device 100 according to the present disclosure, the processor 170 may transmit at least part of data processed in the display device 100 to the wearable device through the wireless communication unit 173. Accordingly, a user of the wearable device may use the data processed in the display device 100 through the wearable device.

The display 180 may convert image signals, data signals, or on-screen display (OSD) signals, which are processed in the processor 170, or images signals or data signals, which are received from the external device interface 135, into R, G, and B signals to generate driving signals.

Meanwhile, the display device 100 illustrated in FIG. 1 is only one embodiment of the present disclosure and thus, some of the illustrated components may be integrated, added, or omitted according to the specification of the actually implemented display device 100.

In other words, if necessary, two or more components may be integrated into one component or one component may be divided into two or more components and configured. Additionally, a function performed by each block is to describe an embodiment of the present disclosure and specific operation or device thereof does not limit the scope of the present disclosure.

According to another embodiment of the present disclosure, unlike FIG. 1, the display device 100 may receive images through the network interface 133 or the external device interface 135 and reproduce the images, without including the tuner 131 and the demodulator 132.

For example, the display device 100 may be divided into an image processing device such as a set-top box for receiving broadcast signals or content according to various network services and a content playback device for reproducing content received from the image processing device.

In this case, a method of operating a display device according to an embodiment of the present disclosure described below may be performed by one of the display device described with reference to FIG. 1, an image processing device such as the divided set-top box, and a content playback device including the display 180 and the audio output unit 185.

Next, a remote control device according to an embodiment of the present disclosure will be described with reference to FIGS. 2 to 3.

Figure 2:
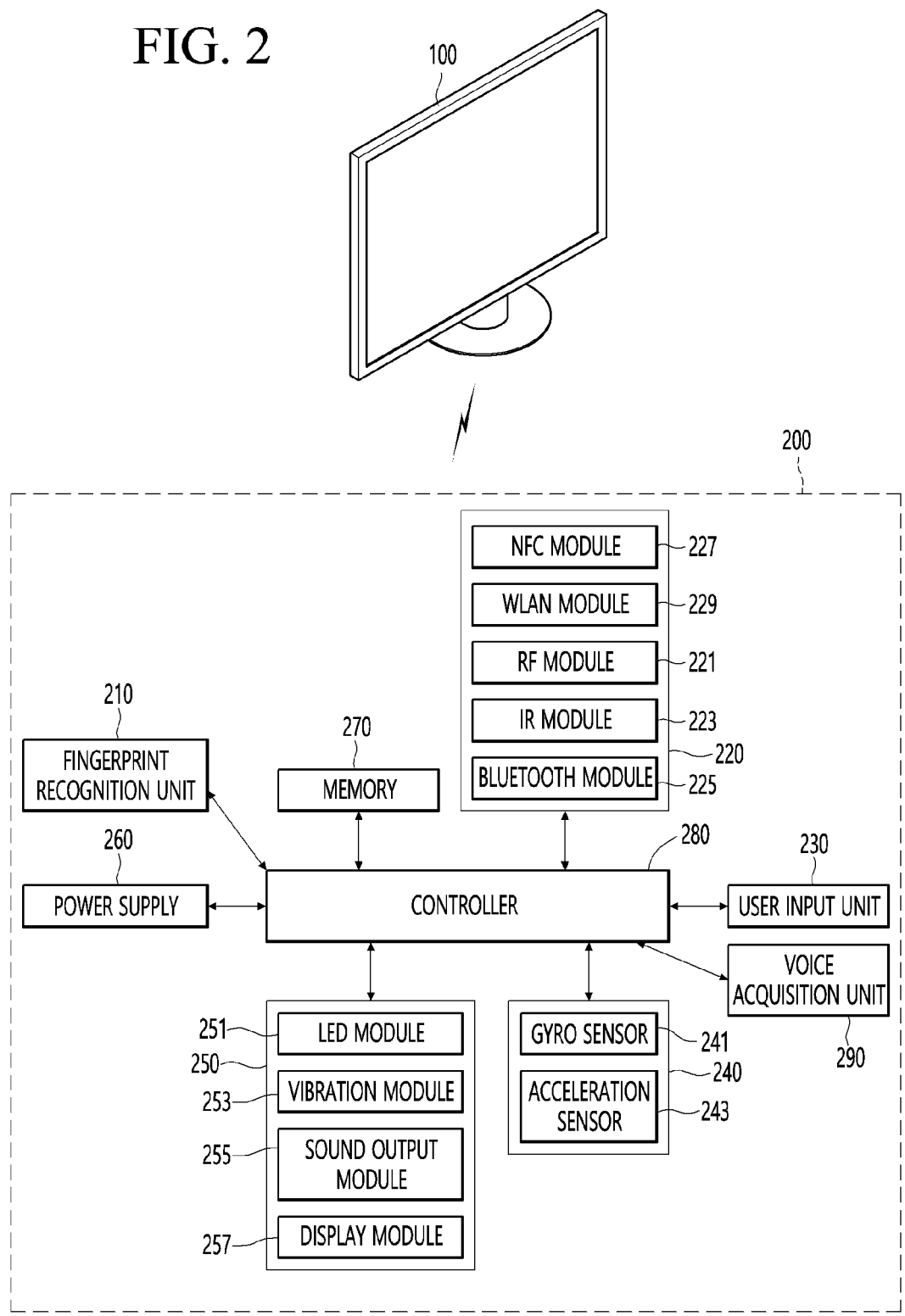
FIG. 2 is a block diagram illustrating a remote control device according to an embodiment of the present disclosure.
Figure 3:
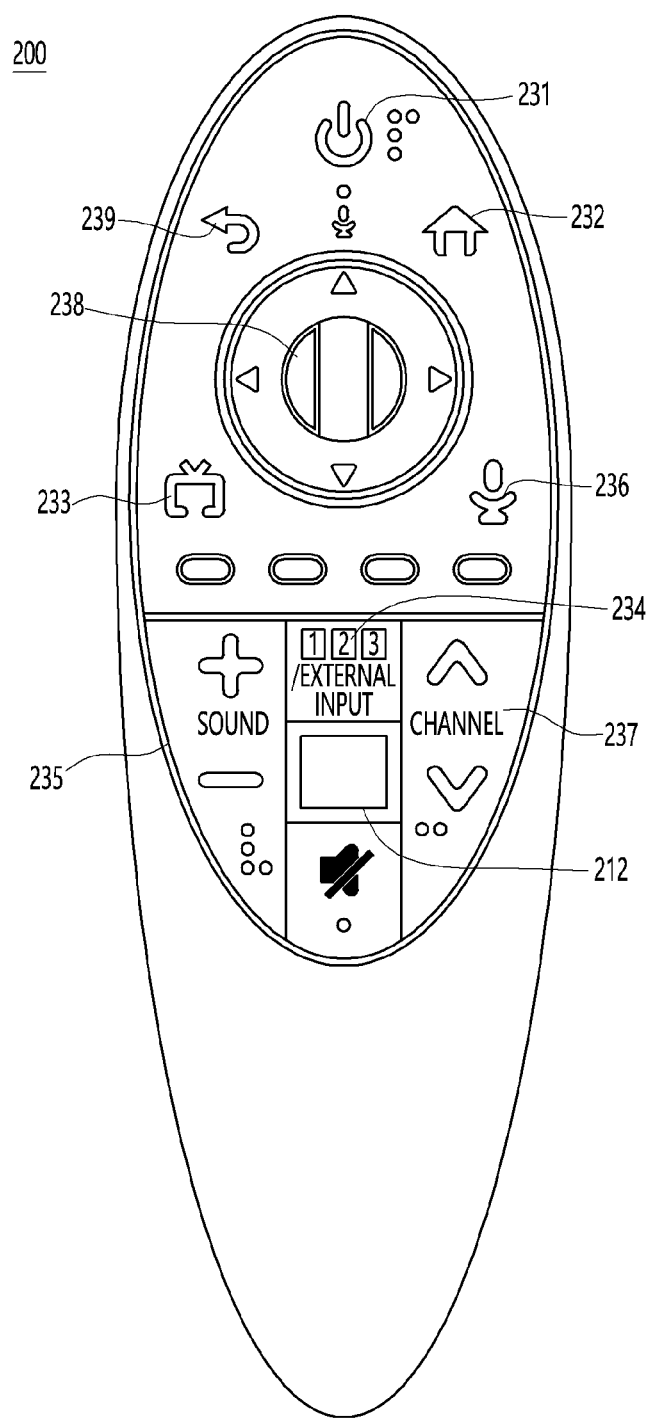
FIG. 3 is a view illustrating an actual configuration of a remote control device according to an embodiment of the present disclosure.

FIG. 2 is a block diagram illustrating a remote control device according to an embodiment of the present disclosure and FIG. 3 is a view illustrating an actual configuration of a remote control device 200 according to an embodiment of the present disclosure.

First, referring to FIG. 2, a remote control device 200 may include a fingerprint recognition unit 210, a wireless communication unit 220, a user input unit 230, a sensor unit 240, an output unit 250, a power supply 260, a memory 270, a controller 280, and a voice acquisition unit 290.

Referring to FIG. 2, the wireless communication unit 220 transmits/receives signals to/from any one of display devices according to the above-mentioned embodiments of the present disclosure.

The remote control device 200 may include a radio frequency (RF) module 221 for transmitting/receiving signals to/from the display device 100 according to the RF communication standards and an IR module 223 for transmitting/receiving signals to/from the display device 100 according to the IR communication standards. Additionally, the remote control device 200 may include a Bluetooth module 225 for transmitting/receiving signals to/from the display device 100 according to the Bluetooth communication standards. Additionally, the remote control device 200 may include a Near Field Communication (NFC) module 227 for transmitting/receiving signals to/from the display device 100 according to the NFC communication standards and a WLAN module 229 for transmitting/receiving signals to/from the display device 100 according to the Wireless LAN (WLAN) communication standards.

Additionally, the remote control device 200 may transmit signals containing information on a movement of the remote control device 200 to the display device 100 through the wireless communication unit 220.

Moreover, the remote control device 200 may receive signals transmitted from the display device 100 through the RF module 221 and if necessary, may transmit a command on power on/off, channel change, and volume change to the display device 100 through the IR module 223.

The user input unit 230 may be composed of a keypad button, a touch pad, or a touchscreen. A user may manipulate the user input unit 230 to input a command relating to the display device 100 to the remote control device 200. If the user input unit 230 includes a hard key button, a user may input a command relating to the display device 100 to the remote control device 200 through the push operation of the hard key button. This will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a voice control button 235, a voice recognition button 236, a channel change button 237, an OK button 238, and a back button 239.

The fingerprint recognition button 212 may be a button for recognizing a user's fingerprint. According to an embodiment of the present disclosure, the fingerprint recognition button 212 may perform a push operation and receive a push operation and a fingerprint recognition operation. The power button 231 may be button for turning on/off the power of the display device 100. The home button 232 may be a button for moving to the home screen of the display device 100. The live button 233 may be a button for displaying live broadcast programs. The external input button 234 may be a button for receiving external input of an external device connected to the display device 100. The voice control button 235 may be a button for controlling the level of a volume output from the display device 100. The voice recognition button 236 may be a button for receiving user's voice and recognizing the received voice. The channel change button 237 may be a button for receiving broadcast signals of a specific broadcast channel. The OK button 238 may be a button for selecting a specific function and the back button 239 may be a button for returning to a previous screen.

FIG. 2 will be described again.

If the user input unit 230 includes a touchscreen, a user may touch a soft key of the touchscreen to input a command relating to the display device 100 to the remote control device 200. Additionally, the user input unit 230 may include various kinds of input units manipulated by a user, for example, a scroll key and a jog key, and this embodiment does not limit the scope of the present disclosure.

The sensor unit 240 may include a gyro sensor 241 or an acceleration sensor 243, and the gyro sensor 241 may sense information on a movement of the remote control device 200.

For example, the gyro sensor 241 may sense information on operation of the remote control device 200 on the basis of x, y, and z axes and the acceleration sensor 243 may sense information on a movement speed of the remote control device 200. Moreover, the remote control device 200 may further include a distance measurement sensor and sense a distance from the display 180 of the display device 100.

The output unit 250 may output image or voice signals corresponding to manipulation of the user input unit 235 or corresponding to signals transmitted from the display device 100. A user may recognize whether the user input unit 235 is manipulated or the display device 100 is controlled through the output unit 250.

For example, the output unit 250 may include an LED module 251 for emitting light, a vibration module 253 for generating vibration, a sound output module 255 for outputting sound, or a display module 257 for outputting an image, if the user input unit 235 is manipulated or signals are transmitted/received to/from the display device 100 through the wireless communication unit 225.

Additionally, the power supply 260 supplies power to the remote control device 200 and, if the remote control device 200 does not move for a predetermined time, stops power supply, thereby reducing power waste. The power supply 260 may resume power supply if a predetermined key provided at the remote control device 200 is manipulated.

The memory 270 may store various kinds of programs and application data necessary for control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 may store, in the memory 270, information on a frequency band for transmitting/receiving signals to/from the display device 100 paired with the remote control device 200, and refer to the information.

The controller 280 controls general matters relating to control of the remote control device 200. The controller 280 may transmit a signal corresponding to a predetermined key manipulation of the user input unit 235 or a signal corresponding to movement of the remote control device 200 sensed by the sensor unit 240 to the display device 100 through the wireless communication unit 225.

Additionally, the voice acquisition unit 290 of the remote control device 200 may obtain voice.

The voice acquisition unit 290 may include at least one microphone 291 and obtain voice through the microphone 291.

Figure 4:
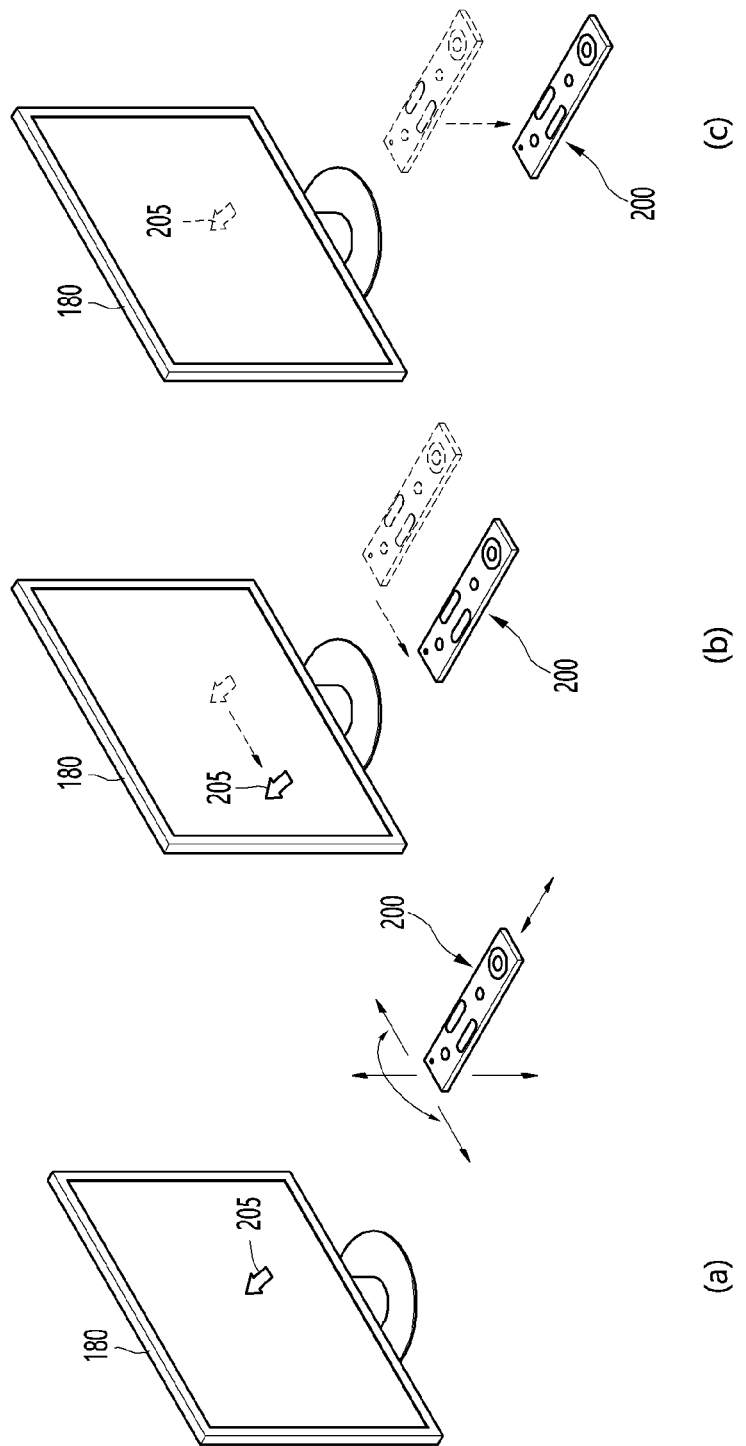
FIG. 4 is a view of utilizing a remote control device according to an embodiment of the present disclosure.

Next, FIG. 4 is illustrated.

FIG. 4 is a view of utilizing a remote control device according to an embodiment of the present disclosure.

FIG. 4(*a*) illustrates that a pointer 205 corresponding to the remote control device 200 is displayed on the display 180.

A user may move or rotate the remote control device 200 vertically or horizontally. The pointer 205 displayed on the display 180 of the display device 100 corresponds to a movement of the remote control device 200. Since the corresponding pointer 205 is moved and displayed according to a movement in a 3D space as shown in the drawing, the remote control device 200 may be referred to as a pointing device.

FIG. 4(*b*) illustrates that, if a user moves the remote control device 200 to the left, the pointer 205 displayed on the display 180 of the display device 100 is moved to the left according to the movement of the remote control device 200.

Information on movement of the remote control device 200 detected through a sensor of the remote control device 200 is transmitted to the display device 100. The display device 100 may calculate the coordinates of the pointer 205 from the information on the movement of the remote control device 200. The display device 100 may display the pointer 205 to correspond to the calculated coordinates.

FIG. 4(*c*) illustrates that, in a state in which a specific button in the remote control device 200 is pressed, a user moves the remote control device 200 away from the display 180. Thus, a selection area in the display 180 corresponding to the pointer 205 may be zoomed in and enlarged.

On the contrary, if the user moves the remote control device 200 to approach the display 180, the selection area in the display 180 corresponding to the pointer 205 may be zoomed out and reduced.

On the other hand, if the remote control device 200 is moved away from the display 180, a selection area may be zoomed out and, if the remote control device 200 is moved closer to the display 180, a selection area may be zoomed in.

Additionally, if a specific button in the remote control device 200 is pressed, recognition of vertical or horizontal movement may be excluded. In other words, if the remote control device 200 is moved away from or closer to the display 180, the up, down, left, or right movement may not be recognized and only the back and forth movement may be recognized. While a specific button in the remote control device 200 is not pressed, only the pointer 205 is moved according to the up, down, left or right movement of the remote control device 200.

Moreover, the moving speed or moving direction of the pointer 205 may correspond to the moving speed or moving direction of the remote control device 200.

Furthermore, a pointer in this specification means an object displayed on the display 180 in response to an operation of the remote control device 200. Accordingly, besides an arrow form displayed as the pointer 205 in the drawing, various forms of objects are possible. For example, this may include a point, a cursor, a prompt, and a thick outline. Then, the pointer 205 may be displayed in correspondence to one point of a horizontal axis and a vertical axis on the display 180 and also may be displayed in correspondence to a plurality of points such as a line and a surface.

Figure 5:
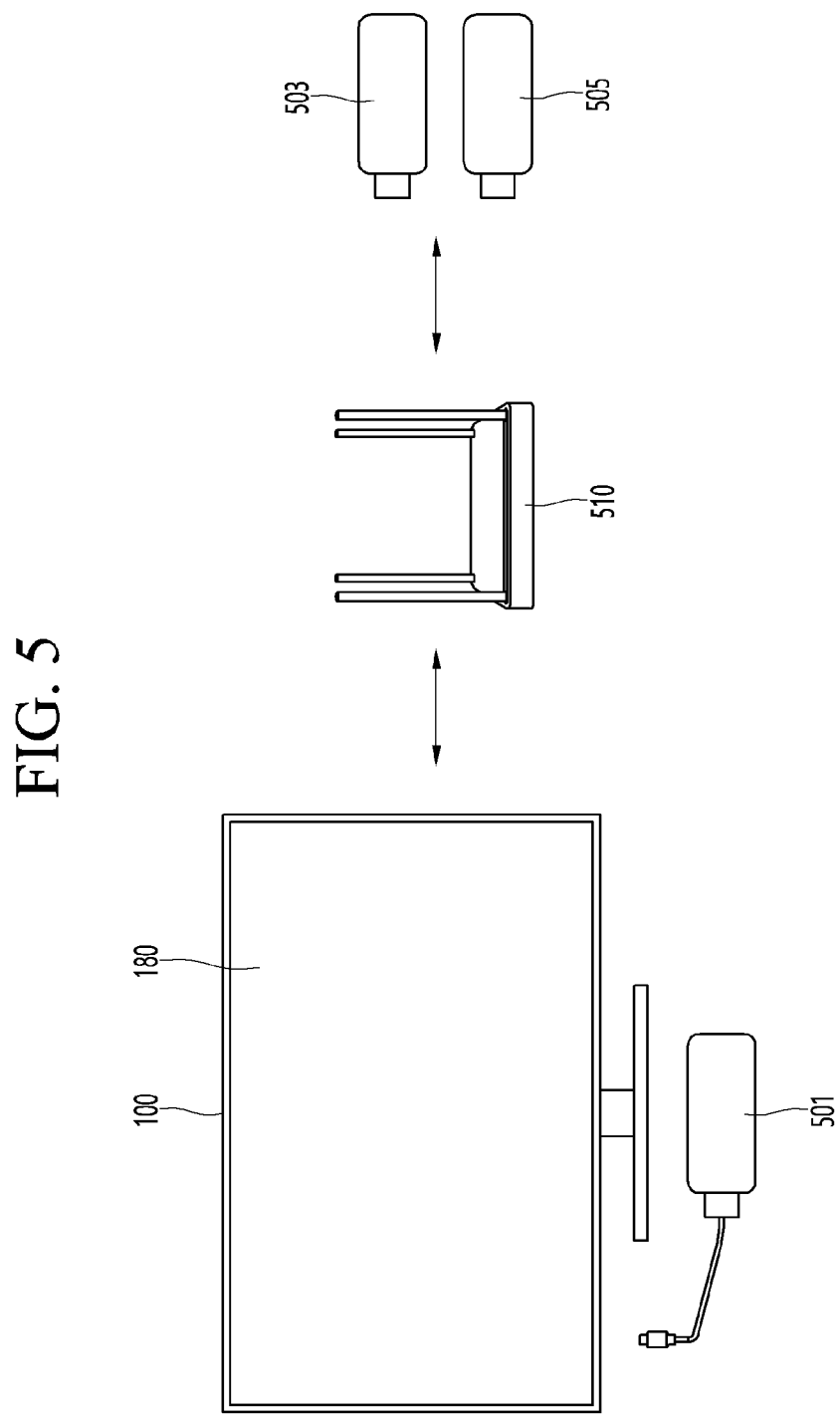
FIG. 5 is a view illustrating a network connection state between devices.

FIG. 5 is a view illustrating a network connection state between devices.

A display device 100 is wirelessly connected with a access point 510. The access point 510 is wirelessly connected with first to third external devices 501, 503 and 505.

The first external device 501 may be connected to the external device interface of the display device 100. Specifically, the first external device 501 may be connected to the HDMI terminal of the external device interface 135.

Each of the first to third external devices 501 to 505 may be a streaming media player device for performing the function of a set-top box.

The streaming media player device may be a dongle type device having a size similar to that of a USB storage device. The streaming media player device may provide a broadcast video, video or the like in a streaming manner.

The first external device 501 may transmit video data and audio data received from the access point 510 to the external device interface 135 of the display device 100.

The display device 100 may output video data and audio data received from the first external device 501.

The second external device 503 and the third external device 505 are wirelessly connected with the access point 510 but may be connected with another display device in the home or a display device located in a neighboring house.

Figures 6, 7:
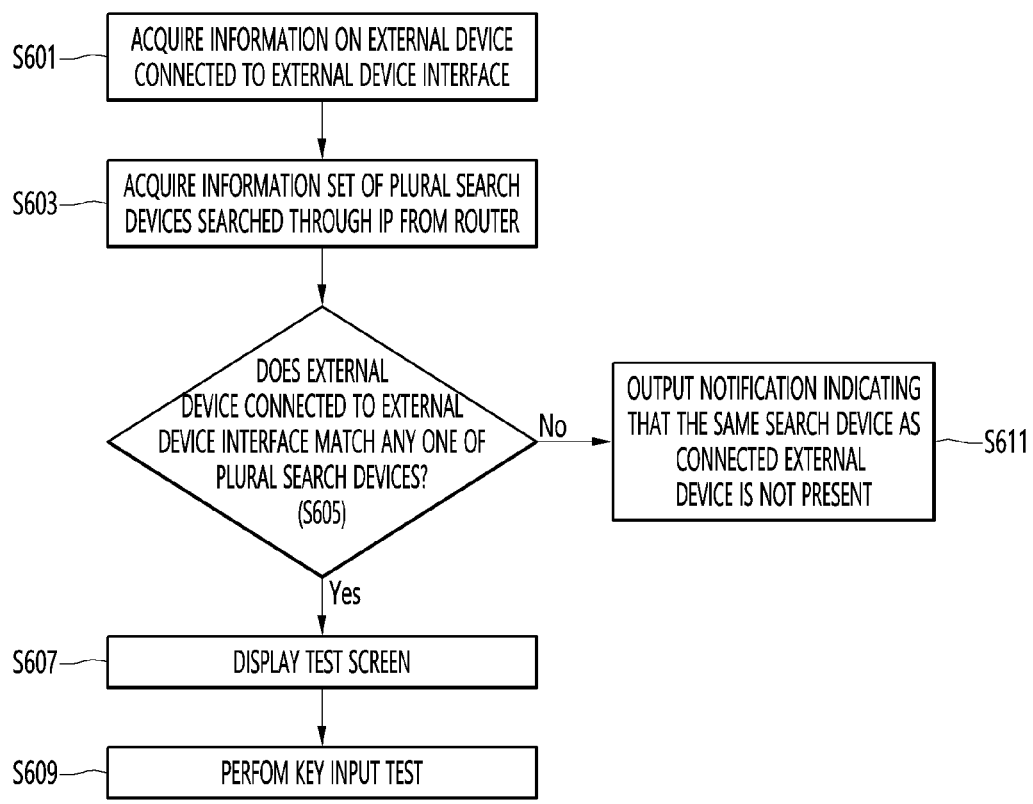
FIG. 6 is a flowchart illustrating a method of operating a display device according to an embodiment of the present disclosure.
FIG. 7 is a view illustrating an example of HDIM SPD information according to an embodiment of the present disclosure.

FIG. 6 is a flowchart illustrating a method of operating a display device according to an embodiment of the present disclosure.

The processor 170 of the display device 100 acquires information on an external device connected through the external device interface 135 of the display device 100 (S601).

In one embodiment, the external device interface 135 may be a HDMI terminal, and the external device may be a streaming media play device described in FIG. 5.

The information on the external device may include one or more of HDMI SPD information or HDMI CEC information.

HDMI SPD (HDMI Source Product Description) information or HDMI CEC (HDMI Consumer Electronics Control) information may include information for identifying the external device connected to the HDMI terminal.

The information for identifying the external device may include one or more of information on a vendor of the external device, information on a type of the external device, a model name of the external device and information on a model number.

FIG. 7 is a view illustrating an example of HDIM SPD information according to an embodiment of the present disclosure.

Referring to FIG. 7, an example of HDMI SPD information received from the external device connected through the HDMI terminal of the display device 100 is shown.

The HDMI SPD information 700 may include a vendor identifier "M" indicating the vendor name of the external device, a description identifier "H" indicating a product description of the external device and a type identifier "Digital STB" indicating a type of the external device.

The processor 170 of the display device 100 may identify the external device connected through the external device interface 135 using the HDMI SPD information 700.

Specifically, the processor 170 may identify one or more of the type, brand and model of the external device based on the vendor identifier, the description identifier and the type identifier included in the HDMI SPD information 700.

The processor 170 may store the identification information (the type, the brand and the model) of the external device corresponding to the HDMI SPD information 700 in the memory 140 in advance.

The processor 170 may determine that the brand of the external device connected to the HDMI terminal is <NaNa stick> through the HDMI SPD information 700 and the identification information of the external device stored in the memory 140.

Although the HDMI SPD information 700 is, for example, described in FIG. 7, the present disclosure is not limited thereto and the HDMI CEC information may also include the information shown in FIG. 7.

FIG. 6 will be described again.

According to another embodiment, the processor 170 may acquire information on the external device using an image recognition scheme.

When the external device is connected, the processor 170 may display a menu screen related to control of the external device based on an image signal received from the external device.

The menu screen may include information on the brand and manufacturer of the external device. The processor 170 may recognize the brand of the external device included in the menu screen and acquire the brand information of the external device.

The processor 170 of the display device 100 receives an information set of a plurality of search devices searched through an internet protocol (IP) from the access point 510 (S603).

Each of the plurality of search devices may be an external device connected to the same access point 510 as the display device 100.

The access point 510 may search for external devices connected to the same network as itself and acquire information on the searched search device.

The information set of the plurality of search devices may include one or more of the name of each search device and the identifier of each search device.

The identifier of the search device may be a character string randomly assigned to the searched device by the access point 510.

The access point 510 may transmit the acquired information set to the display device 100.

In one embodiment, when the external device is connected to the external device interface 135, the display device 100 may transmit a request for the information set to the access point 510, and the access point 510 may transmit the information set to the display device 100 in response to the request.

Figure 8:
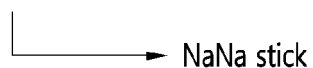
FIG. 8 is a view illustrating an example of information set including information on a plurality of search devices received by a display device from a access point according to an embodiment of the present disclosure.

FIG. 8 is a view illustrating an example of information set including information on a plurality of search devices received by a display device from a access point according to an embodiment of the present disclosure. Referring to FIG. 8, the information set 800 may include information on each of the plurality of search devices searched through IP. The information on each search device may include a device name and a device Id.

The device Id may be randomly assigned by the access point 510 to identify the external device connected to the access point.

As shown in FIG. 8, the information set 800 includes information on three search devices.

The processor 170 may receive the information set from the access point 510 and determine the brand of each search device based on the received information set 800.

The brands of the searched devices may be different from each other.

For example, when the name of the search device is <NaNa>, the processor 170 may determine the brand of the device as <NaNa stick>. The processor 170 may store the name of the search device in the memory 140 in advance.

The processor 170 may acquire the brand of the search device from the name of the search device through the memory 140.

FIG. 6 will be described again.

The processor 170 of the display device 100 determines whether the external device connected to the external device interface 135 matches one or more of the plurality of search devices based on the acquired information on the external device and the information set (S605).

Specifically, the processor 170 may determine whether the brand of the external device determined based on information on the external device matches the brands of the search devices determined based on the information set. When the external device connected to the external device interface 135 matches one or more of the plurality of search devices, the processor 170 displays a test screen on the display 180 (S607).

When the determined brand of the external device is included in the bands of the searched search devices, the processor 170 may display a test screen for a process of checking the external device connected to the external device interface 135 on the display 180.

The test screen may be a screen for controlling the image output by the external device connected to the external device interface 135 through the remote control device 200.

The processor 170 performs a key input test through the test screen (S609).

The key input test may be a test for checking whether the search device searched through the IP network is the external device connected to the external device interface 135 of the display device 100.

The key input test may be performed by input of selecting any one of four directional keys provided in the remote control device 200. This will be described below.

Figure 9:
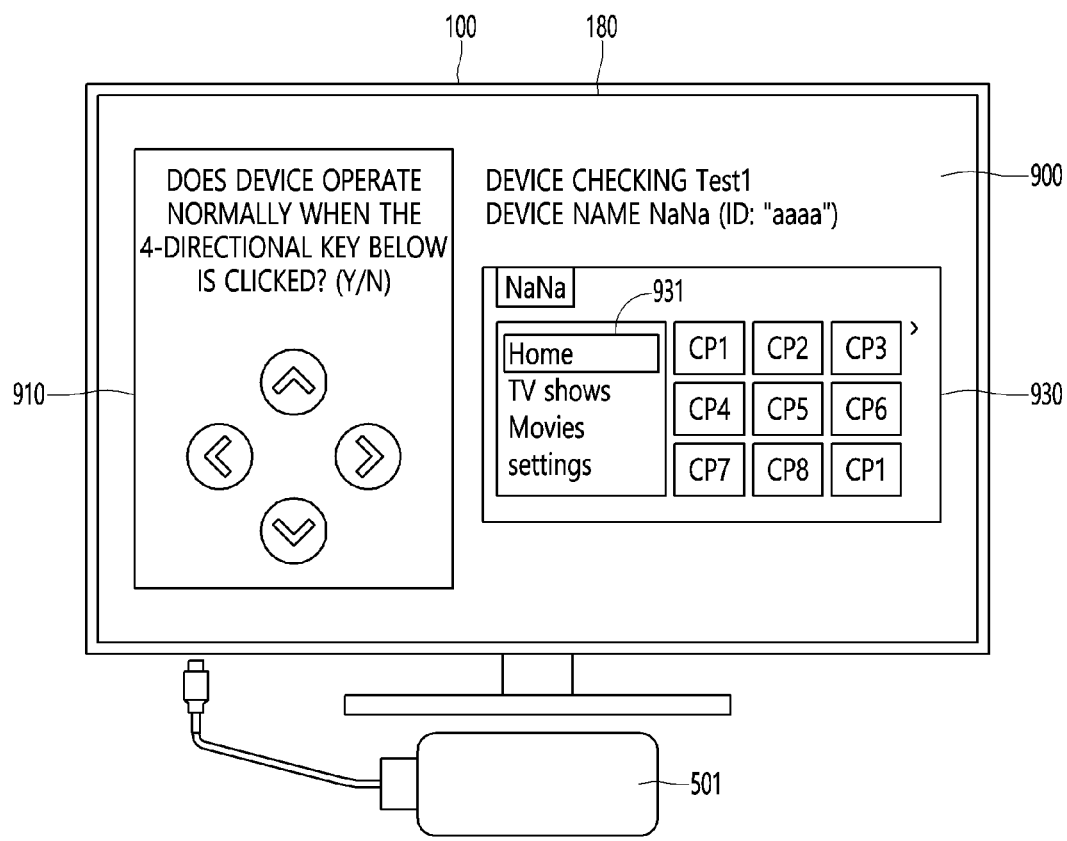
FIGS. 9 to 11 are views illustrating a test process for checking whether a search device searched through an IP network is an external device connected to a display device.
Figure 9:
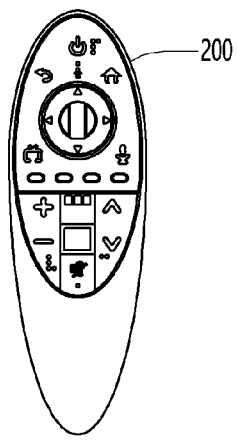
Figure 10:
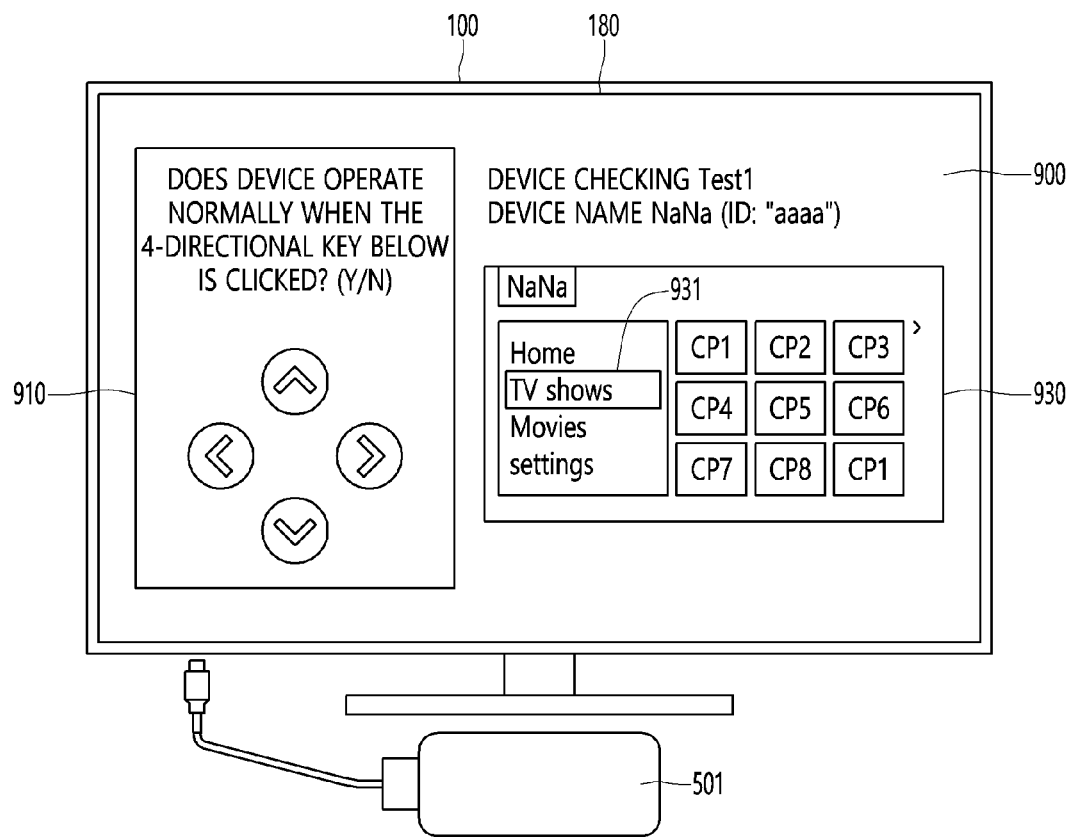
Figure 10:
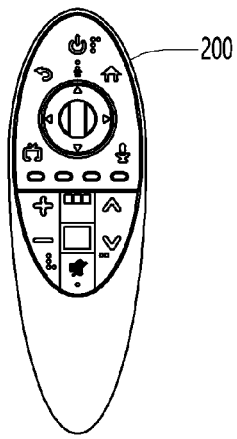
Figure 11:
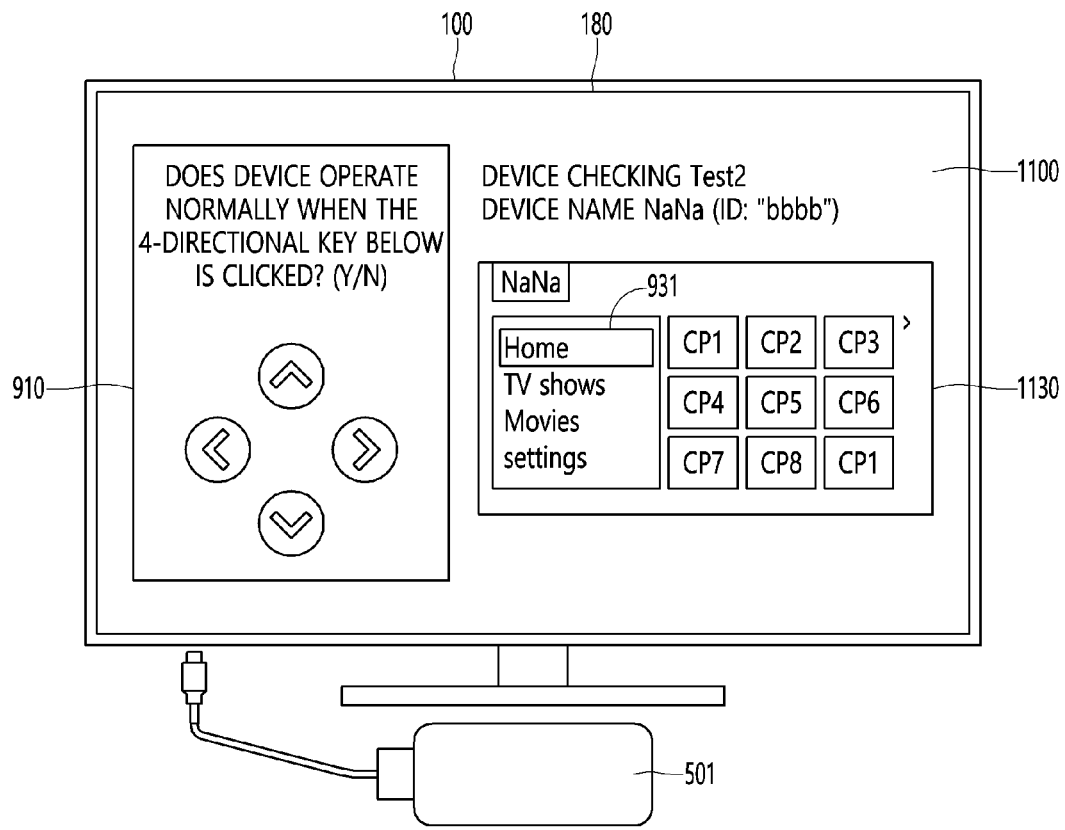
Figure 11:
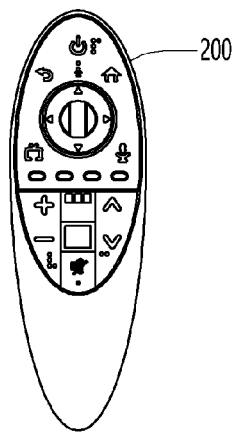

FIGS. 9 to 11 are views illustrating a test process for checking whether a search device searched through an IP network is an external device connected to a display device.

Referring to FIG. 9, when the brand of the search device based on the information set 800 matches the brand of the external device connected to the external device interface 135, the test screen 900 may be displayed on the display 180.

The test screen 900 may include a four-directional-key test screen 910 and a first device UI screen 930.

The four-directional-key test screen 910 may be a screen for guiding whether operation for input of four directional keys provided in the remote control device 200 is properly performed.

The four-directional-key test screen 910 may include images corresponding to the four directional keys and text for inquiring about normal operation of the four directional keys.

The first device UI screen 930 may be a screen corresponding to the first search device connected to the access point 510.

The first device UI screen 930 may be a screen output from the first search device connected to the access point 510.

The first device UI screen 930 may be a screen for testing whether an operation event occurs by the remote control device 200.

On the first device UI screen 930, a highlight box 931 which may move according to input of the four directional keys may be displayed.

The first device UI screen 930 may further include one or more of the name (NaNa) and ID (bbbb) of the first search device.

The display device 100 may receive directional key input received from the remote control device 200 and move the highlight box 931 according to the received directional key input.

A user may determine whether the highlight box 931 moves according to directional key input.

For example, when the user presses a down key on the remote control device, whether the highlight box 931 on the device UI screen 930 moves downward may be determined.

For example, as shown in FIG. 10, when the highlight box 931 moves downward, the user may determine that the first search device searched through the IP network matches the external device 501 connected to the display device 100.

The user selects the OK button on the four-directional-key test screen 910. When the user selects the OK button, the display device 100 may determine that settings of the IP device are completed.

Subsequently, the display device 100 may receive and output video data and audio data, for streaming reproduction of content from the external device 501.

Therefore, the user may check and set the device connected to the display device 100 among the plurality of search devices searched through the access point 510.

Meanwhile, when the user presses the down key on the remote control device 200, the highlight box 931 on the device UI screen 930 may not move downward.

The user selects a "NO" button on the four-directional-key test screen 910. When the user selects the "NO" button, the display device 100 may determine that settings of the IP device are not completed.

The display device 100 may change the first device UI screen 930 to a second device UI screen 1130 in response to input of the "NO" button of the user.

The second device UI screen 1130 may be a screen corresponding to the second search device connected to the access point 510.

The second device UI screen 1130 may be a screen output from the second search device connected to the access point 510.

The second device UI screen 1130 may be a screen for testing whether an operation event occurs by the remote control device 200.

Similarly, on the second device UI screen 1130, a highlight box 931 which may move according to input of the four directional keys may be displayed.

The second device UI screen 1130 may further include one or more of the name (NaNa) and ID (bbbb) of the second search device.

The display device 100 may receive directional key input from the remote control device 200 and move the highlight box 931 according to the received directional key input.

The user may check whether the highlight box 931 moves according to directional key input and performs a test according to the methods of FIGS. 9 and 10.

Therefore, the user may efficiently perform a process of connecting the device searched through the IP network to the display device 100.

FIG. 6 will be described again.

Meanwhile, when the external device connected to the external device interface 135 does not match any one of the plurality of search devices, the processor 170 outputs a notification indicating that the same search device as the connected external device is not present (S611).

When the brand of the external device connected to the external device interface 135 is not included in the acquired brands of the search devices based on the information set 800, the processor 170 may output a notification indicating that the search device having the same brand as the connected external device is not searched.

The processor 170 may output the notification through the display 180 or the audio output unit 185.

Figure 12:
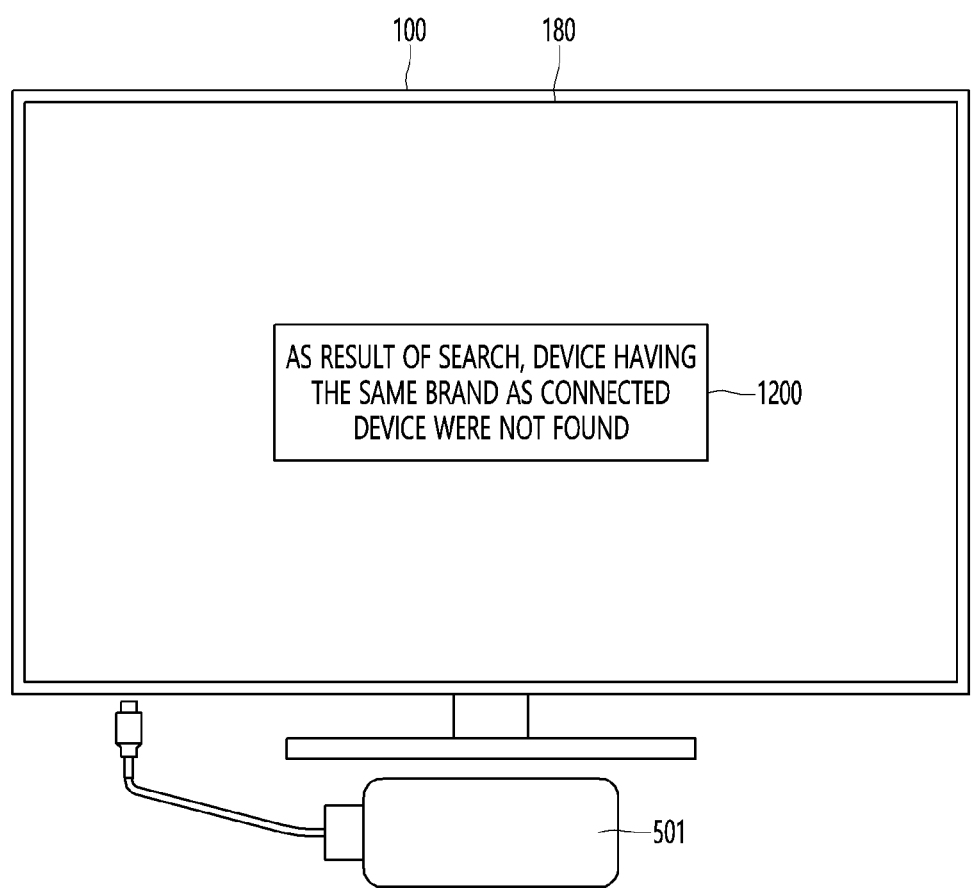
FIG. 12 is a view showing an embodiment showing a notification indicating that a device having the same brand as an external device connected to a display device is not searched for according to an embodiment of the present disclosure.

FIG. 12 is a view showing an embodiment showing a notification indicating that a device having the same brand as an external device connected to a display device is not searched for according to an embodiment of the present disclosure.

Referring to FIG. 12, when the device having the same brand as the external device connected to the external device interface 135 is not searched through the IP network, the display device 100 may display a notification 1200 indicating this on the display 180.

The user may check that the external device 501 connected to the external device interface 135 is not connected to the access point 510 through the notification 1200 and take follow-up measures for connection.

Figure 13:
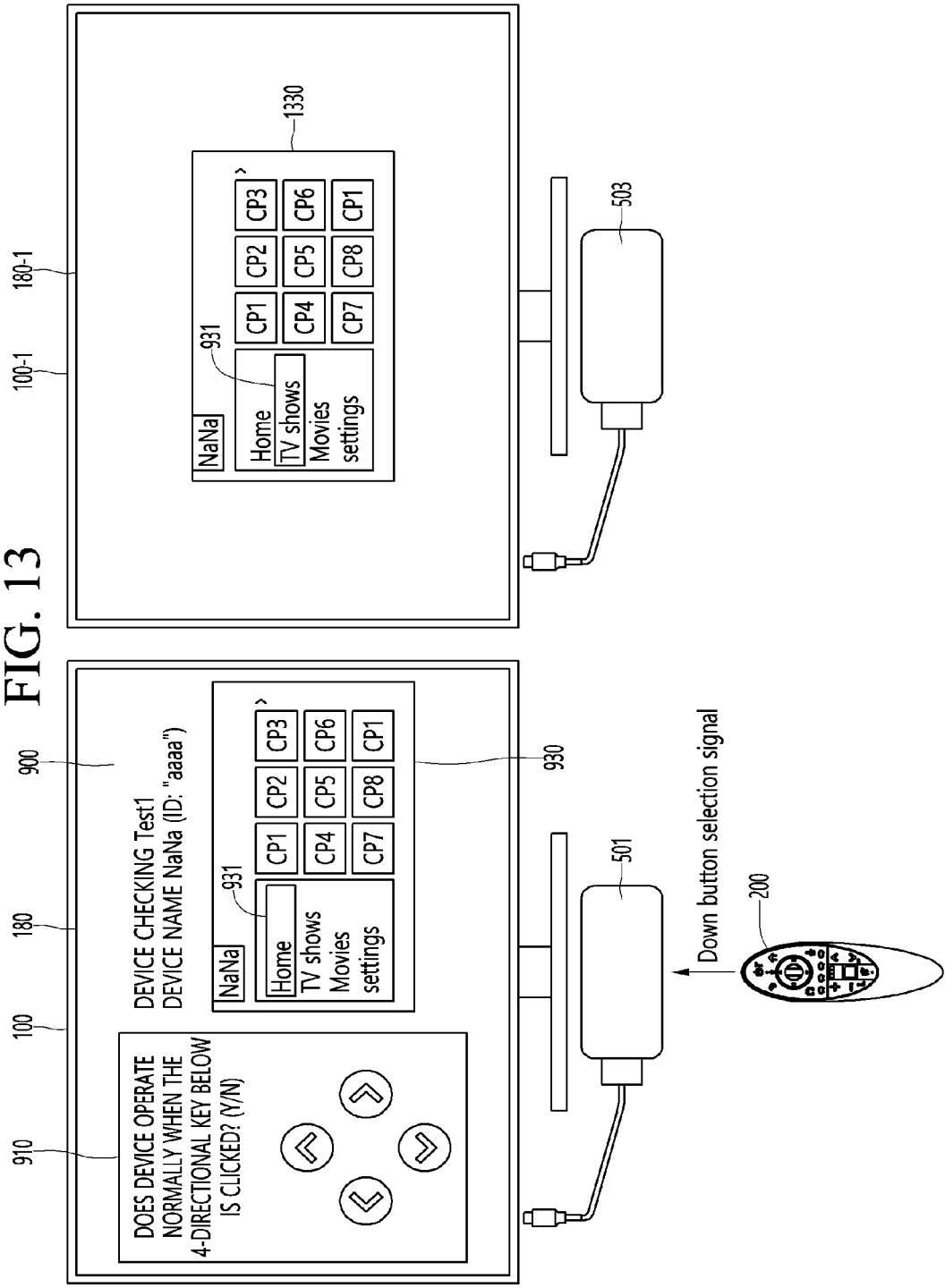
FIGS. 13 and 14 are views a previous state of control illustrating a process of restoring another device to when another device is controlled at the time of a device connection test according to an embodiment of the present disclosure.
Figure 14:
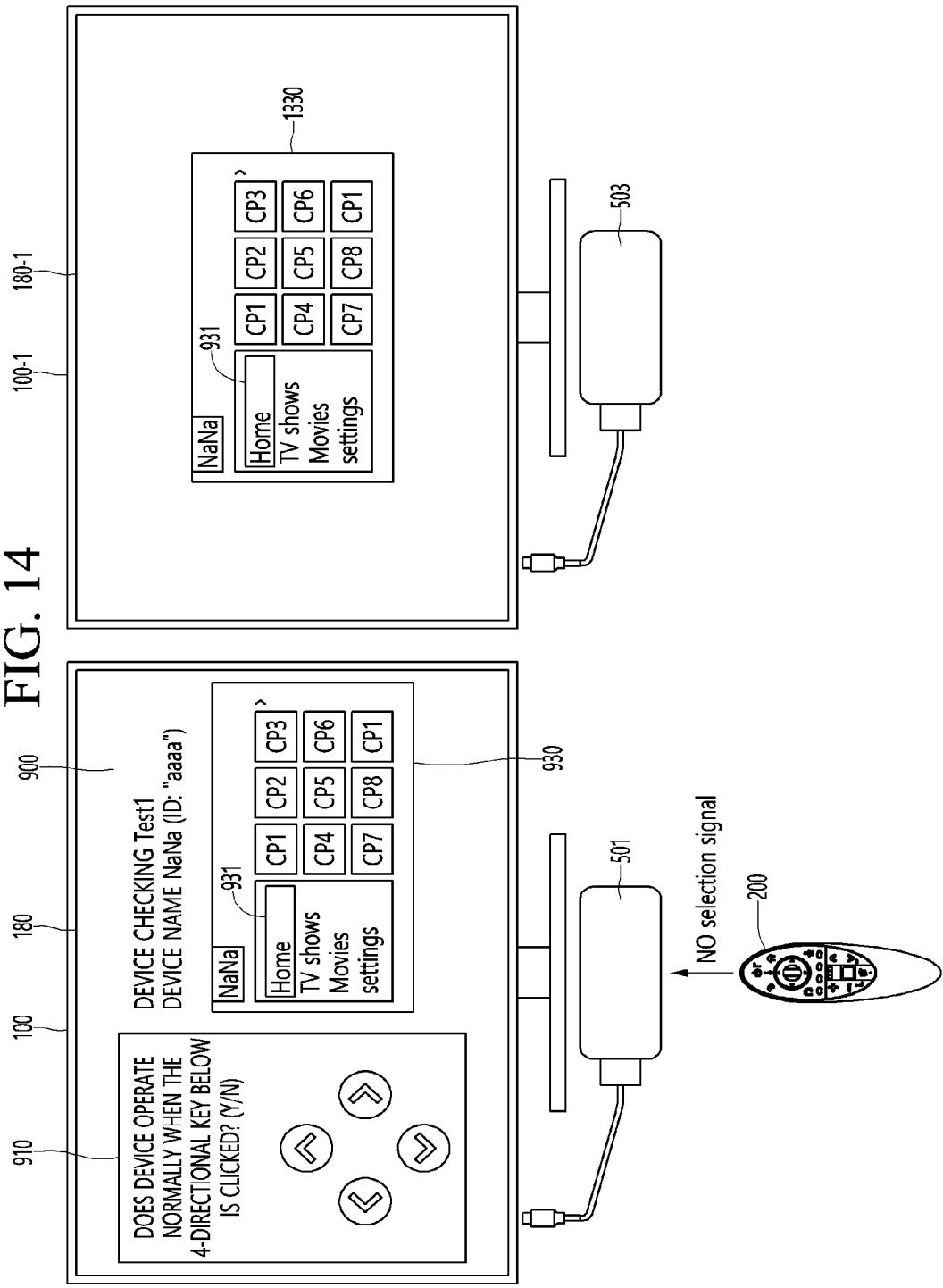

FIGS. 13 and 14 are views illustrating a process of restoring another device to a previous state of control when the other device is controlled at the time of a device connection test according to an embodiment of the present disclosure.

In FIG. 13, it is assumed that the display device 100 connected with the external device 501 and another display device 100-1 connected with another external device 503 are provided in a house.

The display device 100, the external device 501, the other display device 100-1 and the other external device 503 are connected through the same access point.

It is assumed that the first search device corresponding to the first device UI screen 930 does not match the external device 501 connected to the display device 100.

The display device 100 may receive a signal for selecting a down button from the remote control device 200. When the first search device corresponding to the first device UI screen 930 does not match the external device 501 connected to the display device 100, the highlight device 931 may not move.

On the contrary, the highlight box 1301 on the UI screen 1330 of another device displayed on the display 180-1 of the other display device 100-1 may move downward by the down button selection signal.

That is, the other display device 100-1 may move the highlight box 1301 downward by the down button selection signal.

However, since the intention of the user is control of the external device 501 connected to the display device 100, movement of the highlight box 1301 on the other display device 100-1 needs to be restored.

Referring to FIG. 14, the display device 100 may receive a "NO" selection signal indicating that operation for four-directional-key input is not performed from the remote control device 200.

In this case, the other display device 100-1 may move the highlight box 1031 to an original location by the "NO" selection signal.

The other display device 100-1 may recognize the "NO" selection signal as a signal for moving the highlight box 1301 in the opposite direction indicated by the down button signal.

In another example, the display device 100 may transmit the "NO" selection signal received from the remote control device 200 to the other display device 100-1. The other display device 100-1 may move the location of the highlight box 1301 to the original location in response to the "NO" selection signal received from the display device 100.

According to FIGS. 13 and 14, in an IP device checking test, even if another IP device is unintentionally controlled, the control state of the other IP device may be restored to the original state.

According to various embodiments of the present disclosure, it is possible to easily grasp an IP device connected to a display device among a plurality of devices connected through a access point through an external device connection test.

According to the embodiments of the present disclosure, it is possible to control an IP device using a remote controller of a display device when an IP device which may not be controlled through IR communication is connected to the display device.

According to an embodiment of the present disclosure, the above-described method may be embodied as a processor readable code on a medium in which a program is recorded. Examples of processor-readable media include ROM, RAM, CD-ROM, magnetic tape, floppy disk, optical data storage device, and the like, and may be implemented in the form of a carrier wave (for example, transmission over the Internet).

The display device described above may not be limitedly applied to the configuration and method of the above-described embodiments, but the embodiments may be configured by selectively combining all or some of the embodiments so that various modifications may be made.

What is claimed is:

1. A display device comprising:
   a display;

a network interface for connection with a network device;

an external device interface configured to receive image data from an external device; and a processor configured to:

acquire information from the external device through the external device interface, receive, from the network device, an information set of a plurality of search devices connected through a network, and cause, on the display, a display of a test screen for checking connection of the external device based on any one of the plurality of search devices matching the external device based on the acquired information from the external device and the received information set.

2. The display device of claim 1, wherein the processor is further configured to determine a brand of the external device based on the acquired information from the external device, wherein the matching is based at least in part on determining and matching respective brands of the plurality of search devices based on the received information set.

3. The display device of claim 1, wherein the acquired information from the external device comprises at least a name of the external device, a type of the external device, or a vendor of the external device.

4. The display device of claim 3, wherein the external device interface comprises a high-definition multimedia interface (HDMI) terminal, and wherein the acquired information from the external device comprises one or more of HDMI source product description (SPD) information or HDMI consumer electronics control (CEC) information.

5. The display device of claim 1, wherein the processor is further configured to:

cause, on the display, a display of an image based on the received image data from the external device, recognize the received image data, and acquire identification information of the external device.

6. The display device of claim 1, wherein the processor is further configured to request the information set from the network device through the network interface and to receive the information set from the network device in response to the request.

7. The display device of claim 6, wherein the requested information set comprises respective names of the plurality of search devices searched by the network device and respective IDs of the plurality of search devices.

8. The display device of claim 1, wherein the processor is further configured to output a notification indicating that the external device is not found through the network based on there being no device that matches the external device among the plurality of search devices.

9. The display device of claim 1, wherein the test screen comprises a four-directional-key test screen for inducing selection of four directional keys and a user interface (UI) screen corresponding to any one of the plurality of search devices matching the external device.

10. The display device of claim 9, wherein the processor is further configured to change the display of a first UI screen of a first search device to display a second UI screen of a second search device based on selection of a selection signal from among the four directional keys being received from a remote control device.

11. A method of operating a display device, the method comprising:

acquiring information from an external device connected through an external device interface;

receiving, from a network device, an information set of a plurality of search devices connected through a network;

determining whether any one of the plurality of search devices matches the external device based on the acquired information from the external device and the received information set; and displaying, on the display device, a test screen for checking connection of the external device based on any one of the plurality of search devices matching the external device.

12. The method of claim 11, further comprising determining a brand of the external device based on the acquired information from the external device; wherein the matching is based at least in part on determining and matching respective brands of the plurality of search devices based on the received information set.

13. The method of claim 11, wherein the acquired information from the external device comprises at least a name of the external device, a type of the external device, or a vendor of the external device.

14. The method of claim 11, further comprising requesting the information set from the network device, wherein the receiving further comprises receiving the information set from the network device in response to the request.

15. The method of claim 14, wherein the requested information set comprises respective names of the plurality of search devices searched by the network device and respective IDs of the plurality of search devices.

\* \* \* \* \*